July 6, 1954

L. E. NORTON 2,683,218

GAS-LINE STABILIZED OSCILLATOR

Filed May 29, 1951

INVENTOR
Lowell E. Norton
BY
ATTORNEY

July 6, 1954

L. E. NORTON 2,683,218

GAS-LINE STABILIZED OSCILLATOR

Filed May 29, 1951

INVENTOR
Lowell E. Norton
BY
ATTORNEY

July 6, 1954  L. E. NORTON  2,683,218
GAS-LINE STABILIZED OSCILLATOR
Filed May 29, 1951 6 Sheets-Sheet 4

INVENTOR
Lowell E. Norton
BY
ATTORNEY

INVENTOR
Lowell E. Norton
BY J. L. Whittaker
ATTORNEY

Patented July 6, 1954

2,683,218

UNITED STATES PATENT OFFICE 2,683,218

GAS-LINE STABILIZED OSCILLATOR

Lowell E. Norton, Princeton, N. J., assignor to Radio Corporation of America, a corporation of Delaware Application May 29, 1951, Serial No. 228,921

15 Claims. (Cl. 250—36)

This invention relates to the stabilization of oscillators from spectral gas lines for use as time or frequency standards of great precision.

In accordance with the present invention, which in some aspects is an improvement over that disclosed in copending application Serial No. 194,442, the sense and magnitude of deviation from a correct carrier-frequency is determined by repeatedly alternately modulating the carrier at two different frequencies to produce sidebands respectively falling on opposite slopes of the sharp resonance characteristic of a gas line. The switching from one modulating frequency to the other is at frequency low compared to the carrier and modulating frequencies. To insure that the sideband energies as alternately impressed upon the gas are of equal level, they are continuously monitored and any unequality corrected by variation, at switching frequency, of an operating parameter such as the gain of a modulating-frequency amplifier or the percentage modulation of the carrier. It is thus insured that the relative magnitude of half cycle pulses resulting from demodulation, at switching frequency, of the sideband energy passed by the gas shall precisely correspond with frequency deviations of the carrier despite such factors as unequality of the outputs of the modulating-frequency generators, unequality of the gain of the modulating-frequency amplifiers, unequality of standing wave ratios in the microwave system at the two slightly different sampling frequencies, unequality of the modulator efficiencies at the different modulating frequencies, and unequality of the pass characteristics of filtering means at the different sideband frequencies.

In a preferred form of the invention, the sideband energy passed by the gas at microwave frequencies is mixed with oscillations of microwave frequency differing by fixed amount from the carrier-frequency, and the resulting differencefrequency containing the deviation information is amplified at the difference frequency to suitably high level before demodulation. In consequence, the signal/noise ratio of the switching frequency square wave pulses containing the deviation information is better than that obtained in other forms of the invention in which the low level sideband energy passed by the gas is demodulated and raised to suitably high level by amplification at switching frequency.

Further in accordance with the invention, the switching frequency pulses derived by demodulation of the sideband energy transmitted by the gas are converted to a unidirectional frequency-control voltage by a mechanical switch operating in synchronism with switching of the modulating frequencies. The conversion by a mechanical switch, in contrast with conversion by an electronic switch having relatively high and variable contact potential, affords materially enhanced frequency-stability and without need to raise the square wave pulse level to prohibitively high magnitude before conversion.

Further in accordance with the invention, for precise standard time purposes, the oscillator stabilized from the demodulator sideband energy is a low radio-frequency oscillator whose output is frequency-multiplied to the aforesaid microwave carrier-frequency for magnitude comparison of sidebands by the gas-line standard and whose output is frequency-divided to provide low audio-frequency power for energization of a synchronous clock motor.

The invention further resides in methods and systems having the features of novelty and utility hereinafter described and claimed.

For a more detailed understanding of the invention and for illustration of systems embodying it, reference is made to the accompanying drawings in which.

Figure 1:
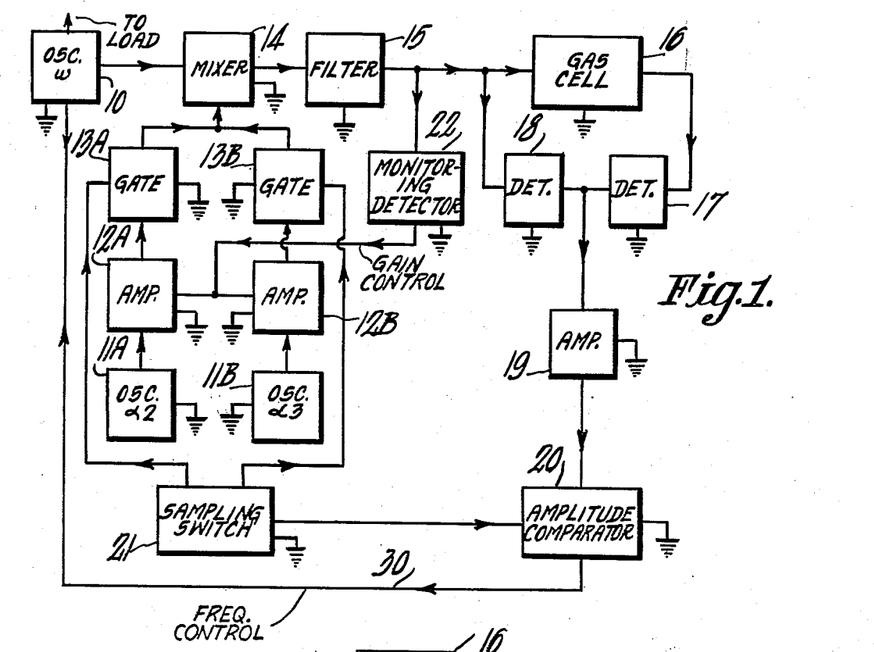
Fig. 1 is a block diagram of a gas-line stabilized oscillator providing a highly precise frequency standard.

Referring to Fig. 1, the oscillator 10 to be used as a highly precise frequency standard may be a klystron, traveling wavetube or other microwave frequency tube. The output frequency $\omega$ of oscillator 10 is repeatedly alternately modulated at two relatively low fixed frequencies $\alpha_2$ and $\alpha_3$, so chosen that two of the resulting sidebands ordinarily at frequencies $\omega+\alpha_2$ and $\omega+\alpha_3$, or $\omega-\alpha_2$ and $\omega-\alpha_3$, fall on the opposite slopes of the sharp resonance characteristic of a gas line for comparison of their relative amplitudes.

More specifically as shown in Fig. 1, the modulating frequencies $\alpha_2$ and $\alpha_3$ may be produced by oscillators 11A and 11B which should be stable oscillators such as provided by crystal control. The modulating frequencies are medium radio frequencies and may, for example, be of the order of 25 megacycles and differ in frequency by a frequency less than a spectral line bandwidth, and could be, for example, 250 kc./s. The outputs of the amplifiers 11A, 11B are respectively amplified by the amplifiers 12A, 12B and alternately applied to mixer 14 by gating switches 13A, 13B. The gates 13A, 13B are alternately conductive and the transition from one to the other is effected at a switching rate low compared to the modulating frequencies, for example 200 cycles per second.

Figure 2A:
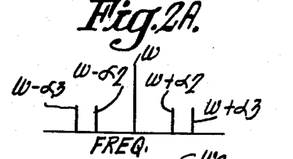
Figs. 2A–2D, 3A–3D and 4A–4D are explanatory figures referred to in description of the operation of Fig. 1 and other figures.

The output frequency $\omega$ of oscillator 10 is also impressed upon a mixer 14 so that, as shown in Fig. 2A, there are produced a pair of upper sidebands $(\omega+\alpha_2)$, $(\omega+\alpha_3)$ and a pair of lower sidebands $(\omega-\alpha_3)$, $(\omega-\alpha_2)$. Although either the upper or lower pair may be used, it will be assumed for purpose of explanation that the upper pair of sidebands are used for stabilization purposes. In such case, the parameters of filter 15 interposed between mixer 14 and gas cell 16 are so chosen as to pass the upper sidebands and to exclude the carrier-frequency and the lower pair of sidebands.

Figures 2B, 2C, 3B, 3C:
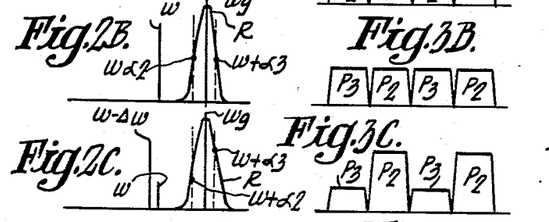

As set forth in copending applications including aforesaid application Serial No. 194,442 and applications referred to therein, there are many gases including ammonia which exhibit sharp molecular resonance at various fixed frequencies in the microwave spectrum. As indicated in Fig. 2B, the frequency $\omega_x$ of a selected one of such spectral lines is substantially midway between the two upper sideband frequencies at the correct value of the carrier-frequency $\omega$. Thus, the two sideband frequencies fall on opposite slopes of the resonance characteristic R of the gas line. This resonance characteristic is far more sharp than indicated in Fig. 2B, but it is necessary for clarity of explanation to broaden the curve.

For the moment assuming that the sideband energies as impressed upon the gas cell are equal, the output of the gas cell is as shown in Fig. 3B, a series of pairs of microwave power amplitudes, $P_2$, $P_3$, all of equal amplitude because of equality of absorption when the sideband frequencies fall on corresponding points of the opposite slopes of the resonance characteristic R of the gas.

Again assuming that the sideband energies as impressed upon cell 16 are equal but that, as shown in Fig. 2C, the carrier-frequency has fallen to a lower value $(\omega-\Delta\omega)$, there is greater absorption of the sideband $(\omega+\alpha_3)$ than of the sideband $(\omega+\alpha_2)$. Accordingly, as shown in Fig. 3C, the output of cell 16 comprises a series of relatively high-amplitude microwave power $P_2$ alternated with a series of low-amplitude microwave power $P_3$.

Again assuming that the sideband powers are equal, as impressed upon cell 16, but that the carrier-frequency has increased to a higher value $(\omega+\Delta\omega)$, the absorption of sideband $(\omega+\alpha_2)$ is greater than the absorption of sideband $(\omega+\alpha_3)$. Accordingly, for positive deviation of the carrier-frequency, the output of cell 16 is a series of high-amplitude microwave power $P_3$ alternating with the series of low-level microwave power $P_2$ (Fig. 3D).

Figure 3A:
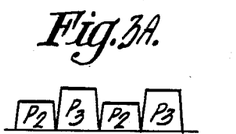
Figure 3D:
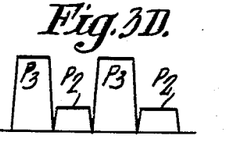

By comparing Figs. 3C and 3D, it will be noted that the sign of the relative amplitudes of the powers $P_2$, $P_3$ reverses with reversal of the sign of the frequency deviation. It should also be appreciated that the magnitude of the relative amplitude of the powers $P_2$, $P_3$ will correspond with the extent of the existing deviation.

Figure 2D:
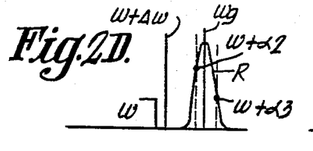

It should be noted that in the foregoing, it has in each case been assumed that the power levels of the sidebands were equal as impressed upon the gas cell. If for any reason they are not equal, the carrier-frequency at which the powers $P_2$, $P_3$ and the output of cell 16 are equal will not correspond with the correct carrier-frequency. On the contrary, at the desired frequency $\omega$, the power amplitudes will be unequal, as for example as shown in Fig. 3A, and such equality would be erroneously interpreted as a frequency deviation. In brief, that the power relations of Figs. 3B–3D should respectively correspond with the frequency relations shown in Figs. 2B–2D, it is essential that the input powers to the gas cell at the two sideband frequencies be equal.

The causes of inequality of the sideband levels as impressed upon the gas cell are many and include for example—unequal outputs of the frequency-modulator amplifiers 11A—11B; inequality of the gains of the amplifiers 12A—12B; presence of a standing wave, however slight, in the microwave system from 10 to detectors 17, 18, which would have slightly different values for sidebands at the two frequencies $\omega+\alpha_2$ and $\omega+\alpha_3$, inequality of the percentage modulation of the carrier affected by mixer 14 at the two different modulating frequencies, and inequality of the pass characteristic of filter 15 at the two sideband frequencies. Even though none of such inequalities may exist when an installation is made or an operating run initiated, it is practically inevitable that such inequalities should arise during operation and become of magnitude precluding stabilization of oscillator 10 with an accuracy better than one part in $10^8$.

Figure 4A:
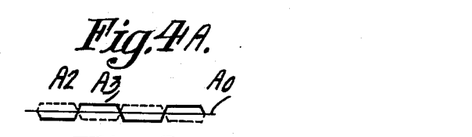

To insure equality of the sideband input levels to gas cell 16, the envelope output of filter 15 is continuously monitored as by detector or demodulator 22. If the sideband levels are equal, the A.-C. envelope output of detector 22 is zero, as indicated by line $A_0$ of Fig. 4A; if the sideband levels are unequal, the A.-C. envelope output of detector 22 is a square wave whose frequency corresponds with the switching or gating frequency $F_s$ and whose phase depends upon which sideband is of the higher level. For example, if the sideband $(\omega+\alpha_3)$ is of the higher level, the sideband powers $P_3$ (Fig. 3A) impressed upon the detector are of greater amplitude and the A.-C. envelope component of the sideband energy obtained from detector 22 is of phase relation shown by curve $A_3$ of Fig. 4A; if, on the other hand, the sideband $(\omega+\alpha_2)$ is of the higher level, the A.-C. demodulator output of detector 22 has the waveform shown by curve $A_2$ of Fig. 4A, which is 180° out of phase with respect to waveform $A_3$.

In accordance with the method and system exemplified by Fig. 1, the switching-frequency output of monitoring detector 22 is used as a gain-control for the modulating-frequency amplifiers 12A, 12B. In brief, A.-C. envelope output of monitoring detector 22 is applied either to raise the gain of the amplifier of the modulating frequency corresponding with the lower level sideband or to lower the gain of the amplifier for the modulating frequency corresponding with the higher level sideband. In either case, since the gain-control is of the same frequency as the gating frequency, only gain-control pulses of one effective polarity are applied to one amplifier for a given sign of the relative amplitude of the pulses $P_2$, $P_3$. The other half cycle of the output of monitor 22 is ineffective since at that time the corresponding gate is not open.

By so controlling the gain of the modulating-frequency amplifier, all causes of inequality of the sideband levels in the output of filter 15 are corrected and accordingly the sign and magnitude of the relative amplitude of the powers $P_2$, $P_3$ as appearing in the output of cell 16 precisely correspond with the sense and extent of any deviation of the carrier frequency.

Figure 4B:
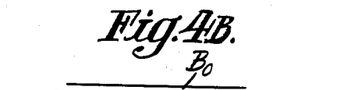
Figure 4C:
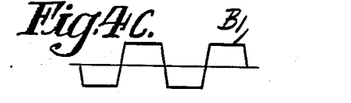
Figure 4D:
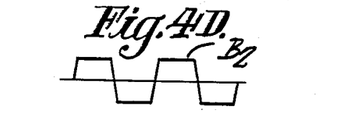

The switched microwave power output of gas cell 16 is converted to a frequency-control voltage for oscillator 10. Such conversion may be effected and the resulting frequency-control voltage applied as shown in aforesaid application Serial No. 194,442. In the particular arrangement shown in Fig. 1 hereof, detectors 17 and 18, which may simply be diodes, are bridged around the gas cell 16 and connected in phase-opposition. Hence, the switching frequency output of the detectors 17, 18 is zero as exemplified by curve $B_0$ (Fig. 4B) when the sideband frequencies are equally spaced above and below the spectral-line frequency $\omega_g$ (Fig. 2B). If, however, there is negative or positive deviation of the carrier-frequency, respectively shown in Figs. 2C, 2D, the output of the detectors 17, 18 is a square wave of switching frequency and of phase dependent upon the sense of the deviation. Such reversal of phase is exemplified by the curves $B_1$, $B_2$ of Figs. 4C and 4D respectively corresponding with the frequency deviations shown in Figs. 2C and 2D.

From the foregoing discussion, it is believed also evident that the amplitude of the detector output depends upon the magnitude of the frequency deviation.

Figure 1A:
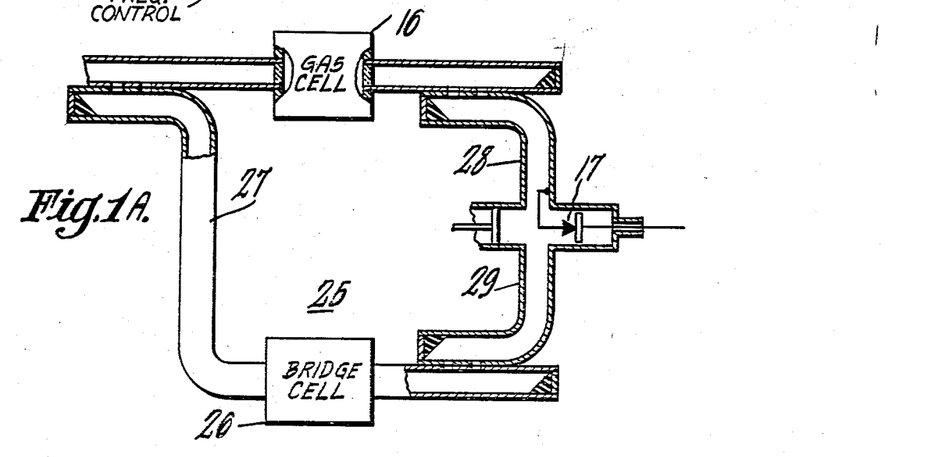
Fig. 1A illustrates a modified gas cell and detector arrangement useful in the system of Fig. 1 and other figures.

It is possible to replace the detectors 17, 18 of Fig. 1 with a single detector supplied from a microwave bridge connected around the gas cell. Such arrangement is shown in Fig. 1A in which the microwave bridge 25 including a bridge cell 26 and unidirectional couplers 27, 28 and 29 is connected across the gas cell 16, the single detector 17 providing a square-wave output at switching frequency $F_s$ and of phase dependent upon the sense of the carrier-frequency deviation. It is also possible to use a single detector with no bridging, but this is not a preferred alternative.

In brief, and with any of these detector arrangements, with the spectral line at fixed frequency $\omega_g$ and with (1) $\qquad \omega_g = \omega + \dfrac{\alpha_2 + \alpha_3}{2}$ the output from the detector at switching rate is zero as the input to the gas cell is switched between sideband frequencies $(\omega + \alpha_2)$, $(\omega + \alpha_3)$. With all arrangements, if the carrier-frequency $\omega$ departs from the relation above defined in Equation No. 1, then there will be square wave output of amplitude dependent upon the magnitude of the deviation and of phase dependent upon the sense of the frequency change. By combining the square wave output of the detector, as amplified by switching-frequency amplifier 19, with a phase-reference voltage derived, for example, from the sampling switch 21 which controls the gates 13A, 13B, there is afforded a unidirectional frequency-control voltage reversing in polarity with reversal of the sense of frequency deviation and applied as by line 30 to frequency-control electrode of oscillator 10.

The amplitude comparator 20 may be of the type shown in aforesaid copending application, Serial No. 194,442, using electronic tubes. However, for the high precision here sought, the comparator is a mechanical synchronous switch discussed in connection with Fig. 5 and per se claimed in my copending application Serial No. 247,685. With electronic comparators, even using selected tubes, it is very difficult to obtain less than a 0.25 volt differential between their contact potentials and quite frequently the differential contact potential is several times greater than this. Moreover, the differential contact potential is usually variable with time—hence, precluding a fixed correction. For example, if two amplitudes at approximately 10 volts are compared, the error will be 2.5% if the differential contact potential is 0.25 volt. Consequently, to obtain frequency precision of about $10^{-8}$, it would be necessary, with the electronic type of amplitude-comparator, to compare amplitudes at inordinately high levels. With the mechanical synchronous switch arrangement 20, 21 used in Fig. 5, the measured contact potential is very small and of the order of $10^{-6}$ volts. Hence, if as before, amplitudes of about 10 volts are compared, the error is only $10^{-7}$ instead of $2.5 \times 10^{-2}$; the frequency error due to this one source alone would be very small and would probably be about $10^{-12}$. In brief, by recourse to the mechanical switching now to be described, the error is reduced by about 250,000 times.

Figure 5:
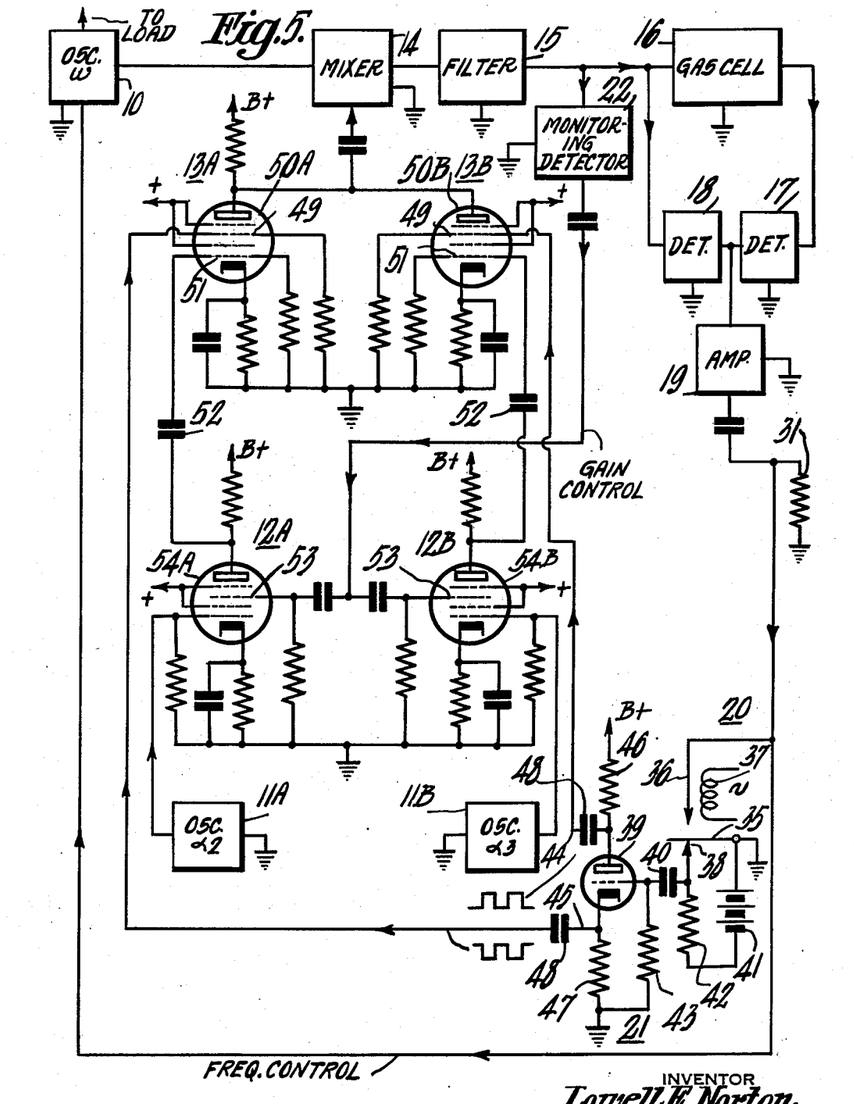
Fig. 5, similar to Fig. 1, schematically shows elements of some block components of Fig. 1.

Referring to Fig. 5, the movable contact 35 of comparator 20 periodically engages the fixed contact 36 to suppress half-waves of one polarity of the output of the switching-frequency amplifier 19. In the particular arrangement shown, engagement of the contacts effectively short-circuits the output impedance 31 of the amplifier. Alternatively, the switch could be used to interrupt the amplifier output circuit.

Figure 6A:
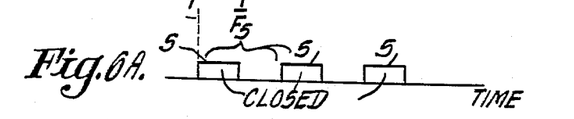
Figs. 6A–6C are explanatory figures referred to in discussion of an amplitude-comparator shown in Figs. 1, 5 and other figures.
Figure 6B:
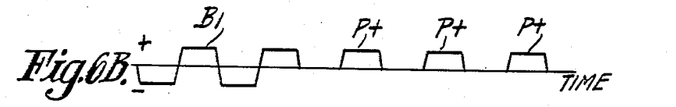
Figure 6C:
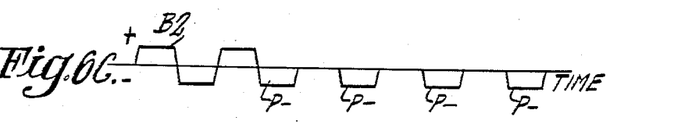

More specifically, as shown in Fig. 6A, the contacts 35, 36 of the comparator 20 are closed for approximately one-half of the period $$\frac{1}{F_s}$$

corresponding with the switching frequency. Of course, if the output of the amplifier 19 is zero, as exists when the carrier-frequency $\omega$ is of correct value, the frequency-control voltage is zero, and remains zero when switch contacts 35, 36 open and close. If, however, the carrier-frequency deviates from its proper value, the A.-C. output of amplifier 19 is a square wave of frequency $F_s$ such as shown by curves $B_1$, $B_2$, of Figs. 6B and 6C. As evident from comparison of Figs. 6A and 6B, when the waveform is of the phasing exemplified by curve $B_1$, the closures of contacts 35, 36 suppress the negative half-waves so that the frequency-control voltage is positive, as exemplified by pulses P+. If, on the other hand, the pulse waveform is of the polarity exemplified by curve $B_2$, the closures of switch 35, 36 suppress the positive half-waves, and the resulting frequency-control voltage is of reverse or negative polarity as exemplified by the pulses P—. Thus, as in the case of electronic amplitude comparators, the output is a unidirectional voltage of polarity corresponding with the sense of the frequency deviation and of magnitude corresponding with the extent of the deviation. However, as above stated, the mechanical comparator provides greatly enhanced precision of frequency-control at reasonably low output levels of amplifier 19.

The movable contact 35 of the comparator switch may be actuated in any suitable manner, as by a cam driven from a synchronous motor, or preferably as shown, by a driving coil 37 energized, from a power line or other source of low frequency.

The amplitude-comparator switch 20 must operate in synchronism with the gating of the modulating frequencies. In the particular arrangement shown in Fig. 5, the movable contact 35 of the amplitude comparator also serves as an element of the sampling switch 21, and hence eliminates all problems of synchronization. Specifically, in Fig. 5, the movable contact 35 when out of engagement with the contact 36 of the amplitude-comparator is in contact with a second fixed contact 38 in the input circuit of tube 39 of sampling switch 21. When vibrating contact 35 is out of engagement with contact 38 of the sampling switch, charging current for the condenser 40 flows from battery 41, or equivalent direct-current source, through a path including the current-limiting resistor 42, condenser 40 and grid resistor 43. Each time contact 35 engages contact 38, the potential in the circuit at the junction of 40 and 38, referred to ground, falls to zero. Thus, vibration of movable contact 35 into and out of engagement with contact 38 impresses upon the grid of tube 39 a square wave voltage at the switching frequency F's.

The square wave input to the tube 39 is converted to push-pull square wave pulses for control of the gates 13A, 13B by connection of the output conductors 44, 45 of switch 21 to the plate and cathode elements of tube 39, the anode and cathode resistors 46, 47 being of substantially equal high value. The blocking condensers 48, 49 in the output leads isolate the gating grids 49 of the gating tubes 50A, 50B from the anode and cathode potentials of the switch tube 39. Thus, for one-half of each cycle of the switching frequency, the gating tube 50A is conductive and for the other half of each switching frequency cycle the tube 50B is conductive alternately to apply the modulating frequencies $\alpha_2$, $\alpha_3$ to mixer 14.

The control grids 51 of the gating tubes are respectively coupled as through blocking condensers 52, to the anodes of the amplifier tubes 12A, 12B. The control grids of the amplifier tubes are respectively coupled to the oscillators 11A, 11B respectively generating the modulating frequencies $\alpha_2$ and $\alpha_3$. The gain of these amplifiers, as discussed in connection with Fig. 1, is continuously under control of the monitoring detector 22 to insure equality of the sidebands $(\omega+\alpha_2)$ and $(\omega+\alpha_3)$ as impressed upon the gas cell. Such control may be effected as shown in Fig. 5 by applying the switching-frequency output of detector 22 to gain-control grids 53 of the amplifier tubes 54A, 54B. Although the gain-control voltage is applied to both grids, it affects only one amplifier tube for a given sense of departure from equality of the sideband levels because the gain-control voltage is at gating frequency and because the gate of the other tube is open at the time when its gain is varied in the improper sense.

Figure 7:
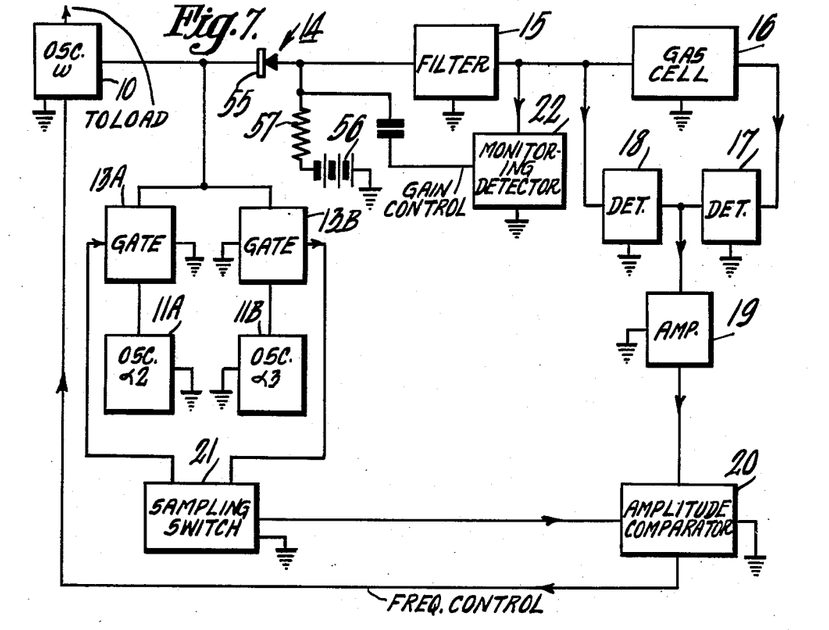
Fig. 7 is a block diagram of another modification of Fig. 1 providing a highly precise frequency standard.

The output of the monitoring detector 22 may be applied in other ways to insure equality of the sideband energies as impressed upon the gas cell 16. For example, as shown in Fig. 7, the square wave output of monitoring detector 22 is applied to vary, at switching frequency, the operating bias of the mixer 14. Specifically, the point on the curved portion of its operating characteristic at which the mixer-diode 55 normally operates may be set by selection or adjustment of the effective voltage of biasing battery 56, or equivalent, and of the effective magnitude of resistor 57. If for any of the causes above enumerated, the sideband pulses 52, 53 in the output of filter 15 are not equal, the square wave output of the monitor 22 will shift the operating point of the mixer for the successive half cycles to effect such different percentages of modulation for the successive half cycles of the switching frequency that equality of the sidebands is closely maintained. In other respects the system of Fig. 7 is similar in composition and operation to Figs. 1 and 5 above discussed and further discussion appears unnecessary as all common components of these systems are identified by the same reference characters.

Figure 7A:
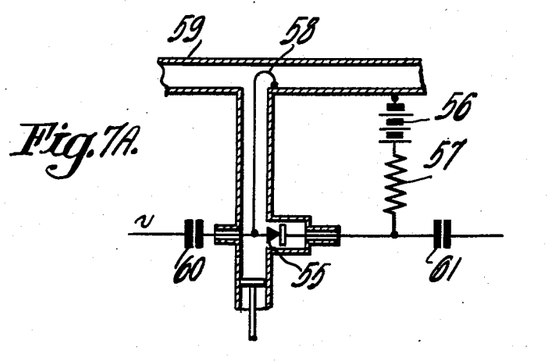
Fig. 7A illustrates a microwave modulator useful in the system of Fig. 7.

A particular mixer arrangement for use in the system of Fig. 7 is shown in Fig. 7A. Briefly, the modulator 55 is coupled as by loop 58 to the output energy of oscillator 10 as transmitted along the wave-guide 59. The mixer diode 55 is also coupled, as through blocking condenser 60, to the common output lead of the gates 13A, 13B. The biasing battery 56 and resistor 57 are connected as shown to provide a direct-current bias path through the diode. The bias control-voltage for monitor 22 is also applied as through isolating condenser 61 to the mixer-diode.

It shall be understood this mixer arrangement is merely exemplary and that many other arrangements may be used for the same purpose.

In the modifications previously described, the low-level sideband energy passed by the gas cell 16 is raised, at switching frequency Fs, to a suitably higher level for impression upon the amplitude-comparator 20. With such arrangement, since the amplification is at audio frequencies, it is difficult to obtain a high signal/noise ratio for small frequency deviations of the carrier; i. e. those of order of 1 part in better than $10^8$. A substantially enhanced signal/noise ratio is obtainable with the modification shown in Fig. 8.

In accordance with the method and system exemplified by this figure, the sideband energies passed by cell 16 are mixed with a microwave frequency offset by fixed amount from the frequency of oscillator 10. In a particular example, in which $\omega_x$ is 23,870.1 mc./s., the 3,3 line of ammonia, the offset may be of the order of 10 megacycles or tens of megacycles. The resulting difference-frequency containing the switching frequency deviation information is then amplified at the difference-frequency by the intermediate-frequency amplifier 65. The output of the amplifier 65 is demodulated as by detector 17A to produce the switching frequency outputs shown in Figs. 4B-4D having null value for zero deviation of frequency $\omega$ and having a phase and amplitude corresponding with deviations of the frequency $\omega$. The amplification being at radio frequencies does not contain excess low frequency noise, so that as compared with the arrangements of Figs. 1, 5 and 7, that of Fig. 8, below more fully described, affords a materially improved signal/noise ratio.

As the difference-frequency impressed upon amplifier 65 should be fixed to insure that its frequency-response characteristic shall not affect the frequency-stabilization, the frequency of the local oscillator 66 should be controlled to follow the frequency deviations of oscillator 10 for maintenance of a fixed difference between the frequencies of these two oscillators.

In the preferred arrangement (Fig. 8) for effecting such result, the outputs of the oscillator 10 to be stabilized and the local oscillator 66 are impressed upon a beat detector 67 which for microwave frequencies may simply be a diode. The resulting difference frequency-output of detector 67 is impressed upon one input circuit of a phase-comparator 68. Upon the other input circuit of the phase-comparator is impressed the output of a third oscillator 69 which need have only moderate frequency stability and normally would be crystal controlled at fixed frequency $$\frac{\alpha_2+\alpha_3}{2}$$

The output of phase-comparator 68 is applied in manner known, per se, to stabilize the frequency of local oscillator 66. In consequence, the operating frequency $\omega_B$ of oscillator 66 is defined by (2) $$\omega_B = \omega + \frac{\alpha_2+\alpha_3}{2}$$

Figure 8:
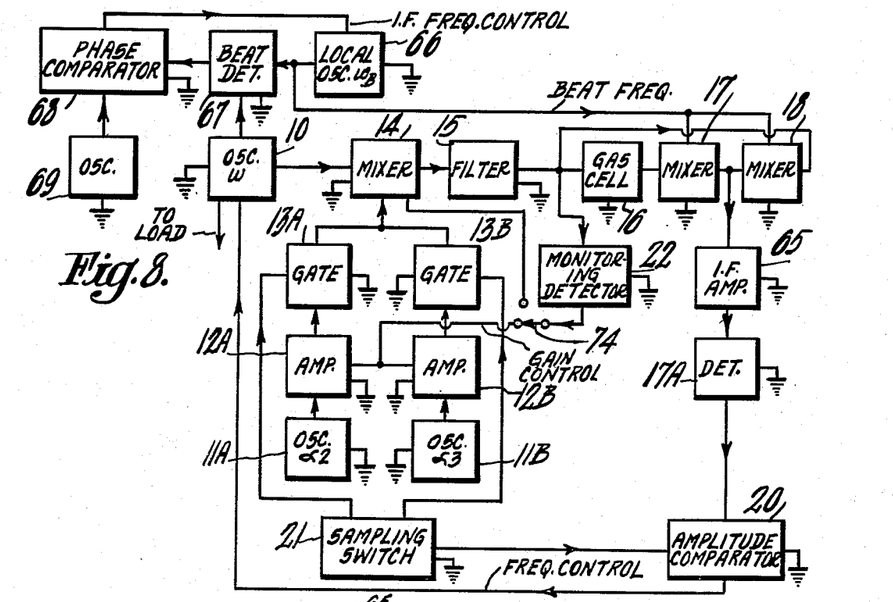
Figs. 8 and 8A are modifications of Figs. 1 and 7 which afford an improved signal/noise ratio.

In other respects, the system of Fig. 8 is similar to those previously herein described and consequently further description thereof appears unnecessary.

By choosing the local oscillator frequency to be $$\omega_B = \omega + \frac{\alpha_2+\alpha_3}{2}$$

this frequency is midway between alternately appearing sideband frequencies $\omega+\alpha_2$ and $\omega+\alpha_3$. Hence the I. F. amplifier 65 frequency is always the same at either $$\omega + \frac{\alpha_2+\alpha_3}{2} - (\omega+\alpha_2) = \frac{\alpha_3-\alpha_2}{2}$$

for the $(\omega+\alpha_2)$ sideband or $$\omega+\alpha_3 - \frac{(\omega+\alpha_2+\alpha_3)}{2} = \frac{\alpha_3-\alpha_2}{2}$$

for the other sideband.

Actually it would not be necessary to use a separate oscillator 69 as shown. Output from oscillators 11A and 11B could be combined in a simple mixer and filter, not shown, to give output at the sum frequency $\alpha_2+\alpha_3$. This output could be applied to any scale of two frequency divider, not shown, to give output as before at frequency $$\frac{\alpha_2+\alpha_3}{2}$$

This output could then be used to replace output from oscillator 69 and oscillator 69 then would no longer be needed.

Figure 8A:
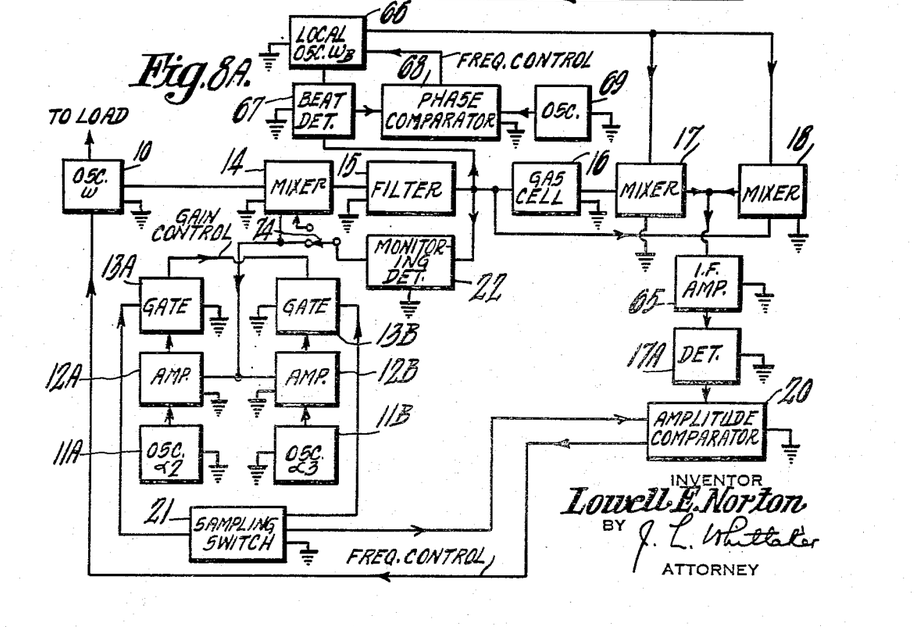

It is also possible to make use of still another method to maintain a constant I. F. frequency applied to 65 as the two frequencies $\omega+\alpha_2$ and $\omega+\alpha_3$ appear alternately from the gas cell 16. This method is shown in Fig. 8A. The only difference is that output from filter 15 which is alternately at frequency $\omega+\alpha_2$ and then at $\omega+\alpha_3$ is applied to beat detector 67, together with output from local oscillator 66. The phase of the difference frequency from this detector is compared with the phase of the output voltage from an offset oscillator 69. The control voltage from the phase detector 68 maintains the output frequency of oscillator 66 offset from the filter 15 output frequency as it changes back and forth between its two values $\omega+\alpha_2$ and $\omega+\alpha_3$. Hence the I. F. frequency applied to 65 is constant and equal to the frequency of oscillator 69.

When a gas line is to be used as a time standard, it is desirable that the oscillator stabilized from the gas line should be a relatively low-frequency oscillator. The system shown in Fig. 9 for such purpose is similar to that of Figs. 1, 5 and 7 except that microwave oscillator 10 is replaced by a relatively low-frequency oscillator 70 followed by a chain of frequency-multipliers 71 which raise the frequency to the microwave frequency $\omega$. From this point on, the stabilizing system is generally the same as that of preceding Figs. 1, 5 and 7 and further description appears unnecessary since the corresponding elements are identified by the same reference characters. As the oscillator 70 is, however, a low-frequency oscillator, it is more convenient to apply the frequency-control output of the amplitude-comparator as a bias for the reactance tube 75. The control of frequency of an oscillator by a reactance tube is per se well known and need not be described.

Figure 9:
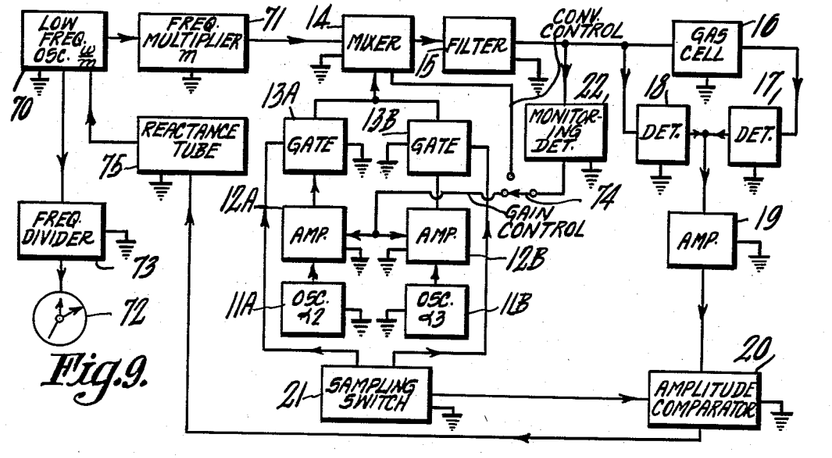
Figs. 9 and 10 are modifications of Figs. 1, 7 and 8 which provide a highly precise time standard.

To provide the low audio-frequency required for energization of clock 72, the low radio-frequency output of oscillator 70 is reduced by a series of binary or decade frequency-dividers 73 which count down from the stabilized low-frequency oscillator to give, for example one second time intervals as a time standard.

Figure 10:
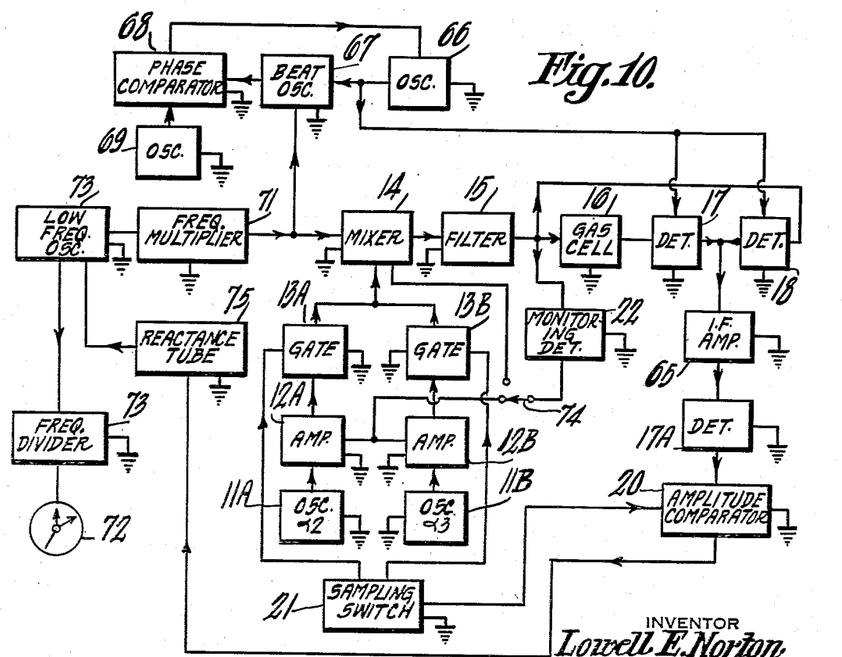

The arrangement of Fig. 10 is similar to that of Fig. 8 in that the output of the gas cell is mixed with that of local oscillator 66 to provide for amplification at an intermediate frequency $$\frac{\alpha_2+\alpha_3}{2}$$

so as to obtain a high signal/noise ratio. It is also possible to obtain the constant I. F. frequency for 65 by the local oscillator offset method described and shown in Fig. 8A. It is also similar to Fig. 9, in that the stabilized oscillator is a low radio-frequency oscillator whose output is frequency-multiplied to the value $\omega$ for stabilization from a gas line and is also frequency-divided to provide the low audio-frequency required for energization of a clock from the stabilized oscillator.

As all other interrelationships have been previously described and since the components of Fig. 10 are identified by the same reference characters used in those preceding figures, further discussion of Fig. 10 appears unnecessary. In Fig. 10, as well as in Figs. 8 and 9, a switch 74 may be provided in the output circuit of monitor 22 for effecting equalization of the sideband energies either by control of amplifier-gain as in Fig. 1 or by modulation percentage as in Fig. 7.

It shall be understood the invention is not limited to the modifications specifically herein described and that changes and modifications may be made within the scope of the appended claims.

What is claimed is:

1. A method of determining the sense of deviation of oscillations from a correct carrier-frequency which comprises modulating said oscillations alternately at two modulating frequencies repeatedly to produce two sidebands having closely adjacent frequencies, continuously monitoring and maintaining equality of the amplitude levels of the sidebands, impressing both the sidebands of equalized amplitude levels upon a single frequency standard sharply resonant at a frequency midway of the sideband frequencies for null deviation of the carrier-frequency, and demodulating the sideband energies passed by the frequency standard to produce pairs of output signals, the sense of whose relative amplitude reverses with reversal of the sense of deviation of the carrier-frequency.

2. A method as in claim 1, in which equality of the amplitude levels of the sidebands as impressed upon the frequency-standard is effected by amplifying the modulating frequencies, and varying the amplification of one or the other of said modulating frequencies in correction of a difference in power level of the sidebands.

3. A method as in claim 1, in which equality of the amplitude levels of the sidebands as impressed upon the frequency standard is effected by varying the percentage-modulation of the carrier by the modulating frequencies in accordance with the difference in power level of the sidebands.

4. A method as in claim 1, in which the modulation of the carrier is effected by low-frequency switching between two modulating frequencies, and in which the sideband energies at the amplitude level passed by the frequency-standard are demodulated at the switching frequency and then amplified.

5. A method as in claim 1, in which the modulation of the carrier is effected by low frequency-switching between two modulating frequencies, in which the sideband energy passed by the frequency-standard is mixed with beating oscillations of frequency differing from the carrier-frequency by half the sum of the modulating frequencies, demodulating the resultant beat to produce sideband energy pulses at the difference-frequency, amplifying the difference-frequency pulses, and demodulating said difference-frequency pulses to derive high-level sideband energy pulses at switching frequency.

6. A method as in claim 1, in which a fixed frequency-difference between the carrier and the beating oscillations is maintained by mixing them, comparing the phase of the resultant beat with fixed frequency oscillations, and varying a frequency-control of the source of the beating oscillations in accordance with the phase deviations.

7. A method as in claim 1, in which the pulses are converted to a unidirectional voltage reversing in polarity with reversal of the frequency-deviation of the carrier-frequency, and in which such unidirectional voltage is applied in correction of the carrier-frequency deviations.

8. A method as in claim 7, in which the unidirectional voltage is applied to the frequency-control electrode of a microwave oscillator, and in which microwave sidebands are impressed upon a body of gas exhibiting sharp molecular resonance at a frequency midway of the microwave sideband frequencies at the correct frequency of said microwave oscillator.

9. A frequency-stabilizing system for an oscillator comprising modulating means for alternately repeatedly modulating a carrier-frequency having fixed relation with the oscillator-frequency to produce two sidebands differing slightly in frequency, a frequency standard upon which both said sidebands are impressed and having a sharp resonant frequency midway of said sideband frequencies at correct frequency of said oscillator, detecting means for comparing in advance of said frequency-standard the amplitude levels of the two sidebands, control means responsive to said detecting means to maintain equality of amplitude levels of the sidebands as impressed upon said frequency-standard, means for demodulating the sideband energies passed by said standard to produce pairs of pulses whose relative amplitude is a precise measure of carrier-frequency deviations, and means for deriving from the pulse pairs for stabilization of said oscillator a unidirectional frequency-control voltage of polarity and magnitude determined by the value and algebraic sign of the relative magnitude of the pulses of successive pairs.

10. A system as in claim 9, in which the modulating means includes two modulating-frequency oscillators and amplifiers for the outputs thereof, and in which the control means varies the gains of said amplifiers to maintain equality of the sideband levels as impressed upon the frequency-standard.

11. A system as in claim 9, in which the modulating means includes a biased mixer, and in which the control means varies the mixer bias to maintain equality of the sideband levels as impressed upon the frequency-standard.

12. A system as in claim 9, in which the modulating means includes periodically operating switching means alternately transmitting two modulating frequencies, and in which the control-voltage deriving means comprises a second switching means operating in synchronism with the first-named switching means.

13. A system as in claim 9, in which there is additionally included a low-frequency amplifier in circuit between the demodulating means and the deriving means for raising the pulse level at low frequency.

14. A system as in claim 9, in which there is additionally included a second oscillator whose frequency differs from that of the first oscillator by one-half the sum of the modulating frequencies and is impressed upon the demodulating means to produce an intermediate frequency pulsed by the sidebands, and in which there is additionally included between the demodulating means and the deriving means an intermediate frequency-amplifier for raising the pulse level at intermediate frequency.

15. A system as in claim 14, including a third oscillator, a phase comparator responsive to said pulsed intermediate frequency and to signals from said third oscillator for providing a frequency-control signal, and means for applying said control signal to vary the frequency of said second oscillator to maintain constant said intermediate frequency.

References Cited in the file of this patent

UNITED STATES PATENTS

| Number | Name | Date |
| --- | --- | --- |
| 2,354,827 | Peterson | Aug. 1, 1944 |
| 2,560,365 | Norton | July 10, 1951 |
| 2,609,654 | Hershberger | Sept. 9, 1952 |